Patented June 14, 1949

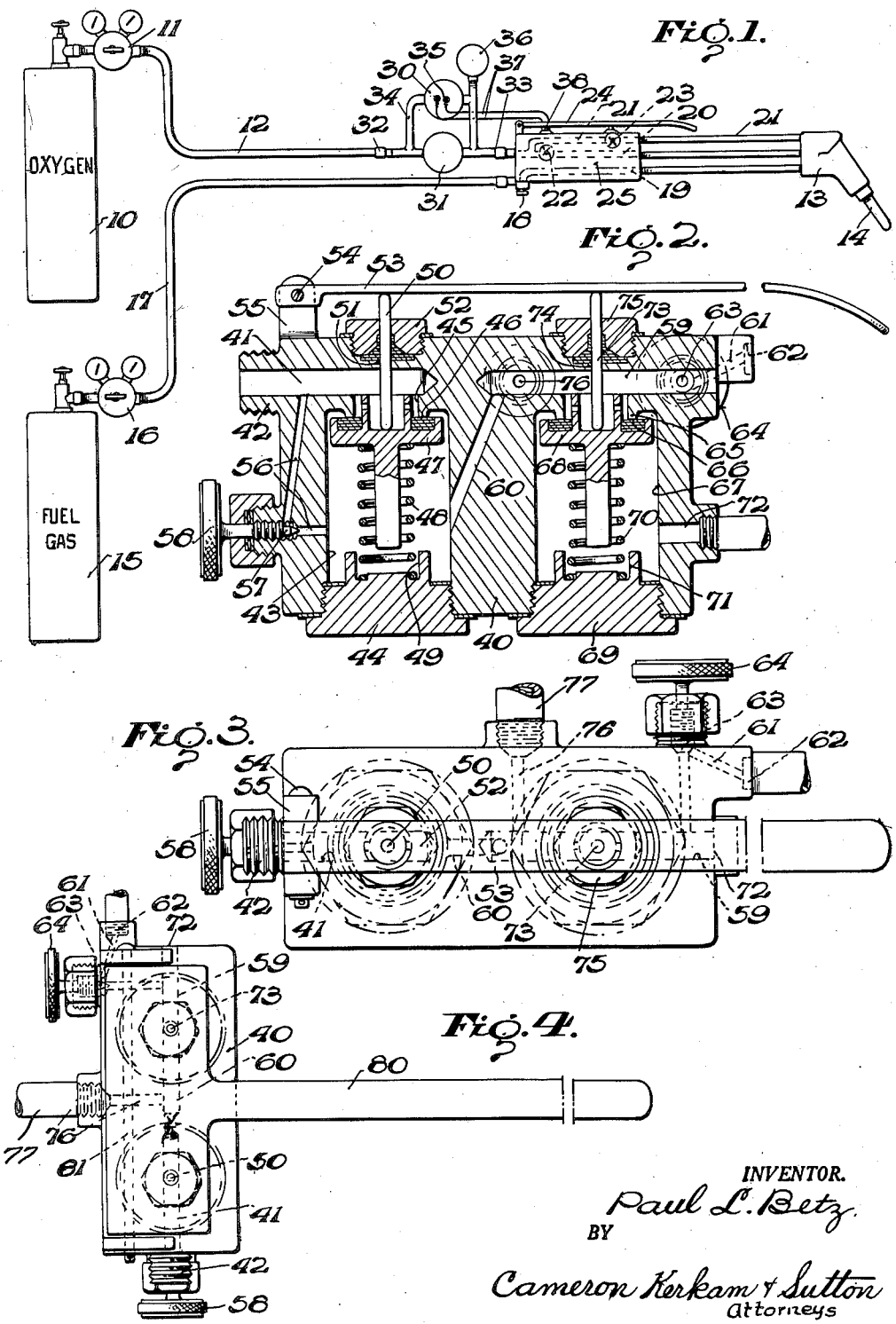

2,473,465

UNITED STATES PATENT OFFICE 2,473,465

APPARATUS FOR IMPROVING THE OPERATION OF OXYGEN CUTTING TORCHES

Paul L. Betz, Baltimore, Md., assignor to Consolidated Gas Electric Light and Power Company of Baltimore, Baltimore, Md., a corporation of Maryland Original application June 5, 1942, Serial No. 445,951, now Patent No. 2,399,979, dated May 7, 1946. Divided and this application December 3, 1945, Serial No. 632,576

15 Claims. (Cl. 158—27.4)

This invention relates to oxygen cutting torches, and more particularly to means for improving the operation of such torches. This application is a division of my application Serial No. 445,951, filed June 5, 1942, Patent No. 2,399,979, granted May 7, 1946.

As ordinarily used for the cutting or burning of metals, oxygen and a fuel gas are supplied to a torch where mixing occurs in such proportions as to give a satisfactory preheat flame. This flame, when applied to the metal to be cut, causes the temperature to rise locally until the ignition or kindling temperature is reached, and at that time a valve is opened to supply a jet of oxygen which strikes the heated metal and causes the metal to burn freely in the oxygen atmosphere.

The usual equipment used for metal cutting by this process includes a supply of high pressure oxygen which passes through a pressure regulator to a length of flexible hose to which is connected the cutting torch. A source of fuel gas under high pressure is also connected to the torch by a length of flexible hose, and within the torch, a throttle valve is usually provided to permit adjustment of the flow of fuel gas to the mixing chamber of the torch. Two paths are usually provided in the torch for the oxygen, one of which includes therein a throttle valve to control the flow of oxygen to the mixing chamber of the torch for the preheat flame, and the other of which includes therein a valve for controlling the flow of cutting oxygen. The mixing chamber supplies a mixture of oxygen and fuel gas to the preheat ports of the torch tip, and the cutting oxygen is directed to a separate port in said tip.

During the preheating of the work, the rate of flow of oxygen is small and the oxygen pressure of the torch is close to that which is obtained at the output side of the pressure regulator, since with such a small flow of oxygen the pressure drop in the oxygen supply hose is negligible. When the ignition point of the metal is reached and the cutting oxygen valve is opened, however, the quantity of oxygen flowing through the hose may be increased as much as six or eightfold, and this high rate of oxygen flow causes a considerable pressure drop in the oxygen hose. Also, it is usually found that under normal operating conditions, the oxygen pressure regulator is unable to maintain the original oxygen pressure at its outlet side when cutting oxygen is flowing because of the magnitude of the pressure drop. Hence there are two factors which lower the oxygen pressure at the torch during cutting. The effect of said lower oxygen pressure at the torch during cutting is to cause a reduced amount of preheat oxygen to be supplied to the torch while the cutting is in progress, and while with some fuels this reduction in preheat oxygen during cutting may be of little consequence, with other fuels the reduction in preheat oxygen causes the flame temperature to decrease to such an extent while the cutting is under way that under some conditions the cutting process may be seriously handicapped thereby.

It is an object of this invention to provide novel means for controlling the flow of oxygen to oxygen cutting torches which will overcome the foregoing difficulties and avoid the pressure drop in the preheat oxygen when the cutting oxygen valve is opened.

A further object of this invention is to provide means of the type characterized which can be readily applied to existing installations or can be readily incorporated in new installations and which assures that a substantially constant oxygen pressure is maintained at the torch whether the cutting oxygen valve is open or closed.

Another object of this invention is to provide an oxygen cutting torch with relatively simple means for carrying out the aforesaid objects.

Another object of this invention is to provide an oxygen cutting torch with means whereby there is no substantial reduction in preheat oxygen pressure during the cutting process over what exists during preheating.

Another object of this invention is to provide an oxygen cutting torch with means which assures that a substantially constant oxygen supply pressure is maintained both during preheating and during progress of the cutting.

Another object of this invention is to provide a device of the type characterized which is simple and compact in structure.

Another object of this invention is to provide a device of the type characterized which may be readily incorporated in existing installations of cutting torches as well as in new torches.

Another object of this invention is to provide a device of the type characterized which readily lends itself to remote control as well as to control by the usual valve operating means located at the torch.

Another object of this invention is to provide a device of the type characterized which may be readily embodied in cutting torches in association with the usual valve means at the torch without materially adding to the weight or bulk of the structure.

Another object of this invention is to provide a device of the type characterized which is easy to manipulate and efficient and certain in operation.

Other objects of the invention will appear as the description thereof proceeds.

The invention is capable of being carried out in a variety of ways and receiving a variety of mechanical expressions, some of which are illustrated on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are used to indicate corresponding parts in the several figures, Fig. 1 is a diagrammatic view illustrating the present invention embodied in a more or less conventional oxygen cutting torch installation;

Fig. 2 is an axial section of a structure embodying the present invention;

Fig. 3 is a top plan view of the device of Fig. 2; and

Fig. 4 is a top plan view of another embodiment of the present invention.

Referring first to Fig. 1, which shows diagrammatically an oxygen cutting torch installation, a source of high pressure oxygen is indicated at 10, and in the outlet therefrom is disposed a pressure regulator 11 with which communicates tubing 12 for conveying gas to the mixing chamber 13 of a cutting torch 14. A source of fuel gas is indicated at 15, and in the outlet therefrom is disposed a pressure regulator 16 with which communicates tubing 17 for conveying fuel gas to the mixing chamber 13 of the torch. A throttle valve is indicated at 18 in the gas passage 19 communicating with the tubing 17 and the mixing chamber 13. The oxygen flowing through tubing 12 has two paths respectively designated 20 and 21, the former being the path for preheat oxygen and the latter being the path for cutting oxygen. A throttle valve 22 is indicated in the passage 20 for the preheat oxygen, and a valve 23 is indicated in the passage 21 for the cutting oxygen. Cutting valve 23 is ordinarily of the quick-acting type so that full flow of oxygen may be established by manual operation thereof, as by the depression of an operating lever 24. The valves 18, 22 and 23 and the lever 24 are usually assembled into a unit as diagrammatically indicated by the block 25 containing the aforesaid passages with the valves therein and operating means therefor supported thereon. The structure as so far described is already known commercially and forms no part of the present invention.

In conformity with the present invention, means are associated with the cutting torch as so far described to overcome the difficulty heretofore explained due to the drop of pressure of the cutting oxygen and to maintain a substantially constant oxygen pressure both during preheating and during the progress of the cutting. A device so embodying the present invention may be applied as an auxiliary device to existing torches, or it may be built into new torches as a component part thereof. When applied to a torch, there are two types of installation to be considered, i. e., torches for automatic or machine cutting and torches for manual cutting. In the case of automatic cutting the device of the present invention may be mounted on or incorporated in the cutting machine proper. In the case of manual cutting, however, it may be desirable to avoid placement of the device on the torch itself because of the additional weight involved, and in this case the auxiliary device may be installed in the oxygen supply line close to the torch but sufficiently removed therefrom to permit the torch to be handled in the usual way.

A device embodying the present invention is indicated schematically at 30 in Fig. 1 and contains the by-pass valve to be referred to. As here shown, a throttle valve 31, manually adjustable for a purpose to be explained, is interposed between the oxygen tube connection 32 with tubing 12 and the supply connection 33 with the passages 20 and 21 leading to the torch. Throttle valve 31 is by-passed by means of a passage 34 in which is placed a valve 35, preferably of the quick acting type so that it may be fully moved between closed and open positions by a simple manipulation. A pressure gauge 36 is employed to indicate the oxygen pressure in the connection 33 leading to the torch. The by-pass valve 35 is operatively connected in any suitable way with the means for operating the valve 23, so that by-pass valve 35 is operated whenever valve 23 is operated. Thus, when valve 23 is opened, by-pass valve 35 is opened, and when valve 23 is closed, by-pass valve 35 is closed. By-pass valve 35 may be linked mechanically to the valve 23, so that they are operated together by the operating lever 24 as explained in connection with the embodiments of Figs. 2 to 4, or by-pass valve 35 may be a solenoid type valve energized by a circuit which includes a suitable switch 38 associated with the valve 23 and circuit connections 37 so that when the lever 24 is depressed to open valve 23 the switch may be closed to energize the solenoid and open valve 35.

Fig. 1 illustrates a case wherein the present invention is incorporated in a device directly connected to the cutting torch. Where manual cutting is to be done, it may be desirable to separate device 30 from the cutting torch by a short length of tubing so that the torch may be handled in the usual manner. In this case, the tubing is to be interposed between the connection 33 and the outlet side of the device 30, and valve 35 in that case would preferably be of the solenoid type because of the ease of operating such a valve by a circuit making and breaking device associated with the operating lever 24.

To illustrate the use of the present invention, assume that by opening valves 31 and 35 the torch may be used in the usual manner but the pressures existing at the torch as so used may be determined by reference to the pressure gauge 36. Thus the drop in oxygen pressure between preheat and cutting conditions may be determined. For example, suppose the pressure on the outlet side of the oxygen regulator 11 is adjusted to fifty pounds per square inch for a desired flow of preheat oxygen. With the relatively low flow of preheat oxygen the pressure at the gauge 36, indicating the pressure at the torch, would be approximately fifty pounds per square inch during the preheat operation, since the frictional drop of pressure through the tubing would be small.

Upon opening the cutting oxygen valve 23, however, the increased flow of oxygen will cause the pressure at the outlet of the regulator 11 to drop—say five pounds, i. e., to forty-five pounds per square inch due to the more rapid flow of oxygen. The frictional drop in pressure due to the flow through the tubing may be assumed to approximate ten pounds per square inch, so that the oxygen pressure at the torch as indicated by the pressure gauge 36 will now be thirty-five pounds per square inch. Thus, without making use of the present invention in the example under consideration, the oxygen pressure decreases from fifty pounds per square inch to thirty-five pounds per square inch between preheat and cutting conditions. This variation may be eliminated by using the present invention in the following manner. Let us assume that the desired constant oxygen pressure for preheating and cutting is fifty pounds per square inch. First, regulator 11 is adjusted to maintain the oxygen pressure at the torch at fifty pounds per square inch and preheat oxygen valve 22 and fuel valve 18 are adjusted to give the desired preheating mixture. During this operation, valves 23 and 35 remain closed, valve 31 is open and oxygen pressure is determined on gauge 36. Next, valves 23 and 35 are opened, thereby initiating the flow of cutting oxygen and regulator 11 is readjusted to restore the oxygen pressure at the torch to fifty pounds per square inch, as indicated on pressure gauge 36. Following this cutting oxygen valve 23 is closed together with the by-pass valve 35 to establish preheat conditions. It will now be observed that the pressure indicated on the gauge 36 rises above fifty pounds per square inch due to the adjustment that has been made at the oxygen regulator 11. Throttle valve 31 is now adjusted until the pressure gauge 36 again indicates an oxygen pressure of fifty pounds per square inch under conditions of preheat, this being the pressure at which the preheat adjustment was originally made. Therefore, the quantity of preheat oxygen is now the same as before since the oxygen pressure is the same. When by-pass valve 35 is opened simultaneously with the oxygen cutting valve 23, however, the increased flow of oxygen provided by the by-pass 34 will, under the conditions assumed, assure that the oxygen pressure at the torch, as indicated by the gauge 36, is again fifty pounds per square inch for the cutting operation. Thus by somewhat increasing the oxygen pressure at the outlet of the source 10 to assure the desired pressure at the torch when the by-pass 34 is opened and throttling the flow of pre-heat oxygen by valve 31, the same pressure may be maintained at the torch both during pre-heating and while cutting is in progress.

As an alternate, though more approximate, method, the adjustment may be made as follows. With valve 22 closed or partially closed the cutting oxygen valve 23 is opened together with by-pass valve 35 and the oxygen regulator 11 is adjusted to provide the desired cutting oxygen pressure at the torch, as indicated on gauge 36. Cutting oxygen valve 23 is then closed together with by-pass valve 35, and the desired preheat adjustment is made using fuel valve 18 and oxygen valves 31 and 22, care being taken that the adjustment of throttle valve 31 is such as to provide the above referred to cutting oxygen pressure at the torch, when the desired preheat adjustment is attained. By this adjustment, the change in oxygen pressure at the torch between cutting and preheat conditions may be reduced or eliminated according to the closeness with which the preheat oxygen flow during the adjustment of regulator 11 approaches the required preheat oxygen flow for the preheat adjustment involving manipulation of valves 18, 31 and 22, as outlined above.

As so far described, the invention has been treated as embodied in a form whereby it may be interposed in the oxygen connection to the torch. The present invention, however, may be readily embodied in the torch structure itself without materially increasing the weight or bulk thereof. Figs. 2 to 4 illustrate embodiments whereby the by-pass 34 and associated valves 31, 35 may be readily combined in the unit which has heretofore included the valves 18, 22 and 23, together with their actuating means. For simplicity, the passage for the fuel gas and its throttling valve have been omitted from the section and plan views of Figs. 2 to 4, but it is to be understood that the structure to be described would be provided with a passage, such as 19 in Fig. 1, and a throttle valve, such as 18 in Fig. 1, for controlling the flow of fuel gas as hereinbefore described.

Focusing attention on the oxygen passages and valves, any suitable base structure 40 is provided with an inlet passage 41, here shown as having an exteriorly threaded nipple 42, corresponding to the connection 32 of Fig. 1. Base 40 is provided with an interior chamber 43 closed by a removable end plug 44, and said chamber 43 may communicate with the passage 41 through a port 45 provided with a valve seat 46. Cooperating with valve seat 46 is a valve member 47 which is normally urged into closed position by a coil spring 48 reacting between said valve member and a spring seat 49 on the plug 44. Valve member 47 may be opened against the tension of its spring by a slidable pin 50 extending through an aperture 51 in the wall of the passage 41 and having a suitably packed gland 52 to prevent leakage of oxygen. At its outer end said pin 50 cooperates with a manually operated device of any suitable construction, here shown as in the form of a lever 53 pivotally mounted at 54 on lugs 55 projecting from the base 40. As will hereinafter appear, valve 46, 47 corresponds in function and operation to the by-pass valve 35 of Fig. 1.

Also formed in the base 40 is a passage 56 which communicates with the passage 41 and the chamber 43, and interposed in this passage is a throttle valve 57 of any suitable construction provided with a manually operable hand wheel 58. Throttle valve 57 corresponds in function to the throttle valve 31 of Fig. 1, and when the valve 46, 47 is closed the preheat oxygen flows through the passages 41 and 56 to the chamber 43 in volume as determined by the throttle valve 57.

Also formed in the base 40 is a passage 59 which communicates with the chamber 43 through a passage 60. Also communicating with passage 59 is a passage 61 leading to any suitable connection 62, which is the preheat oxygen connection corresponding to the connection 29 of Fig. 1. Associated with said passage 61 is a throttle valve 63 of any suitable construction, here shown as of the same form as illustrated at 57, said valve having an operating hand wheel 64. Valve 63 is a throttle valve for the preheat oxygen and corresponds in function to the valve 22 of Fig. 1.

Communicating with the passage 59 through a port 65 having a valve seat 66 is a chamber 67 in which is disposed a valve member 68. Chamber 67 is closed by removable end plug 69, and the valve 68 is normally urged toward closed position by a coil spring 70 reacting between valve member 68 and a suitable spring seat 71 on the plug 69. It will be observed that chamber 67 with its contained valve mechanism may be of the same size and construction as the chamber 43 with its contained valve mechanism. Communicating with the chamber 67 is an outlet passage 72 to which is connected the connection for the cutting oxygen. Valve member 68 cooperates with a pin 73 slidably extending through an aperture 74 in the wall of the passage 59 and having any suitable gland 75 to prevent leakage of oxygen. Pin 73 at its outer end cooperates with the lever 53 heretofore referred to. Valve 66, 68 corresponds in function to the valve 23 of Fig. 1 and the outlet passage 72 corresponds to the passage 21 of Fig. 1.

Also communicating with the passage 59 is a passage 76 leading to any suitable connection 77 extending to a pressure indicator such as diagrammatically indicated at 36 in Fig. 1.

When lever 53 is depressed both of the pins 50 and 73 are moved inwardly to move valve members 47 and 68 off of their respective seats 46 and 66, and cutting oxygen may flow from the passage 41 through port 45 to chamber 43 and through passages 60, 59, port 65 and chamber 67 to outlet connection 72. Thus the valves as shown in Fig. 2 function in the same way as the valves above described in conjunction with the embodiment of Fig. 1. It will also be observed that analogously as the connection to the pressure indicator 36 in Fig. 1 is on the torch side of the valves 31 and 35, and ahead of the valves 22 and 23, so in Fig. 2 the connection to the pressure indicator at 76 is on the torch side of the valves 46, 47 and 57 and ahead of the valves 63 and 66, 68. Accordingly, the embodiment of Fig. 2 may be operated and set for maintaining the fixed and predetermined pressure of oxygen flow both during preheat and the progress of the cutting operation as above described in conjunction with the embodiment of Fig. 1.

In the embodiment of Figs. 2 and 3 the lever 53 which operates the pins 50 and 73 has different lever arms so that the magnitude of movement of the valve members 47 and 68 will be different. In some cases it may be desirable to provide equal magnitudes of movement for the valve members 47 and 68, and Fig. 4 illustrates an embodiment of the present invention in which this result is accomplished. The structure of the base member 40 and its contained or supported passages, valve means, etc., are or may be the same in Fig. 4 as in Figs. 2 and 3, and the same reference characters have been used to indicate corresponding parts. In Fig. 4, however, the operating lever 80 is pivoted at 81 transversely to the length of the base 40 and the pins 73 and 50 operated by said lever 80 are at equal distances from the axis of the lever 80 so that the magnitude of movement of the valve members 68 and 47 is the same.

It will therefore be perceived that by the present invention an oxygen cutting torch has been provided with means whereby opening of the valve controlling flow of cutting oxygen does not cause a diminution in pressure of the oxygen flowing to the port for preheat oxygen, and therefore the difficulties heretofore encountered by reason of such drop in the preheat oxygen, in devices as heretofore constructed, have been entirely overcome. Furthermore, the device accomplishing the aforesaid results is one that can be readily applied to installations of oxygen cutting torches already in use, whether for machine cutting or for manual cutting, and the invention may also be equally embodied in new torches as well as applied as an auxiliary device for existing installations. In either event, the present invention provides a relatively simple, compact and easily manipulated device which accomplishes the foregoing results with certainty and efficiency and as the manipulations required for obtaining the novel results are relatively simple in character they may be readily and satisfactorily performed by the usual operators of devices of this character.

While the embodiments of the invention illustrated on the drawings have been described with considerable particularity, it is to be expressly understood that the invention is not restricted thereto. As will now be apparent to those skilled in the art, this invention may be carried out in a variety of ways and with structures of a wide variety of form. While the invention has been exemplified by preferred structures, the invention in its broader aspects may be incorporated in a wide variety of devices, and changes may be made in the details of construction and arrangement of the passages, valve means, operating means for the valve means, etc., without departing from the spirit of this invention. Reference is therefore to be had to the appended claims for a definition of this invention.

What is claimed is:

1. In a device for controlling the flow of oxygen to an oxygen cutting torch having separate passages for flow of preheat oxygen and cutting oxygen and a fuel passage and a valve at the torch for controlling flow of cutting oxygen, the combination of means providing two oxygen passages in parallel having outlets in communication with said first named oxygen passages, one of said passages including a non-throttling valve for opening and closing said passage and the other of said passages including a throttling valve disposed in said passage on its upstream side from its outlet, and means for operating said non-throttling valve simultaneously with the operation of said valve on the torch for controlling the flow of cutting oxygen.

2. In a device for controlling the flow of oxygen to an oxygen cutting torch having separate passages for flow of preheat oxygen and cutting oxygen and a fuel passage and a valve at the torch for controlling flow of cutting oxygen, the combination of means providing two oxygen passages connected in parallel and having a common outlet in communication with said first named oxygen passages, one of said passages including a non-throttling valve for opening and closing said passage and the other of said passages including a throttling valve on the upstream side from said outlet, means for operating said non-throttling valve simultaneously with the operation of said valve on the torch for controlling the flow of cutting oxygen, and pressure indicating means associated with the outlet of said parallel connected passages for determining the pressure of the oxygen when said non-throttling valve is open and closed.

3. In a device for controlling the flow of oxygen to an oxygen torch having separate passages for flow of preheat oxygen and cutting oxygen and a fuel passage and a valve at the torch for controlling flow of cutting oxygen, the combination of means remote from said torch and providing two passages in parallel, means providing communication between said last named passages and said first named oxygen passages one of said passages including a non-throttling valve for opening and closing said passage and the other of said passages including a throttling valve on its upstream side from said communicating means, and electromagnetic means operatively connected to said non-throttling valve and actuated by said valve on the torch for controlling flow of cutting oxygen for opening and closing said non-throttling and cutting oxygen valves in unison.

4. In a device for controlling the flow of oxygen to an oxygen cutting torch having separate passages for flow of preheat oxygen and cutting oxygen and a fuel passage and a valve at the torch for controlling flow of cutting oxygen, the combination of means adjacent to said torch and providing two passages in parallel having outlets in communication with said first named oxygen passages, one of said passages including a non-throttling valve for opening and closing said passage and the other of said passages including a throttling valve on the upstream side from its outlet, and mechanical means interconnecting said non-throttling valve and said valve at the torch for controlling flow of cutting oxygen for opening and closing said non-throttling and cutting oxygen valves in unison.

5. In a device for controlling the flow of oxygen to an oxygen cutting torch having separate passages for flow of preheat oxygen and cutting oxygen and a fuel passage and a valve at the torch for controlling flow of cutting oxygen, the combination of means providing two passages in parallel having a common outlet in communication with said first named oxygen passages, one of said passages including a non-throttling valve for opening and closing said passage and the other of said passages including a throttling valve on the upstream side of said outlet, and common means operatively connected to said non-throttling valve and said valve at the torch for simultaneously opening and closing said non-throttling and cutting oxygen valve to control the flow of cutting oxygen.

6. In a device for controlling the oxygen pressure at an oxygen cutting torch having means providing a fuel passage and separate passages for the flow of preheat oxygen and cutting oxygen and valves for said passages including a valve for opening and closing the passage for cutting oxygen and means for operating said cutting oxygen valve, the combination of means providing a pair of passages in parallel with each other for respectively conveying preheat oxygen and cutting oxygen, said passages having a common inlet and a common outlet in communication with said first named oxygen passages, a throttling valve in that one of said last named passages which conveys preheat oxygen and on the upstream side of said outlet, a non-throttling valve for opening and closing the other of said last named passages, and means for operating said last named valve from said operating means for the cutting oxygen valve.

7. In a device for controlling the oxygen pressure at an oxygen cutting torch having means providing a fuel passage and separate passages for the flow of preheat oxygen and cutting oxygen and valves for said passages including a valve for opening and closing the passage for cutting oxygen and means for operating said cutting oxygen valve, the combination of means providing a pair of passages in parallel with each other for respectively conveying preheat oxygen and cutting oxygen, said passages having a common inlet and a common outlet in communication with said first named oxygen passages, a throttling valve in that one of said last named passages which conveys preheat oxygen and on the upstream side of said outlet, a non-throttling valve for opening and closing the other of said last named passages, means for operating said last named valve from said operating means for the cutting oxygen valve and pressure indicating means in communication with said last named passages and responsive to the oxygen pressure therein on the outlet sides of the valves in said passages.

8. In a device for controlling the oxygen pressure of an oxygen cutting torch having means providing a fuel passage and separate passages for the flow of preheat oxygen and cutting oxygen and valves for said passages including a valve for opening and closing the passage for cutting oxygen and means for operating said cutting oxygen valve, the combination of means providing a pair of passages in parallel with each other for respectively conveying preheat oxygen and cutting oxygen, said passages having a common inlet and a common outlet in communication with said first named oxygen passages, a throttling valve in that one of said last named passages which conveys preheat oxygen and on the upstream side of said outlet, a non-throttling valve for opening and closing the other of said last named passages, and means for operating said last named valve operated by said operating means for the cutting oxygen valve, said operating means including a lever pivoted on said passage-providing means and members operated by said lever for simultaneously opening or closing said non-throttling valve and said valve in said cutting oxygen passage.

9. In a device for controlling the flow of oxygen to an oxygen cutting torch, a base member provided with a chamber, means having an outlet for cuttinng oxygen communicating with said chamber, means providing a passage for the flow of preheat oxygen around said chamber but having a port communicating with said chamber, means providing a second chamber communicating with said passage, means forming an inlet passage and having a port communicating with said second chamber, valves controlling said ports, a common operating means for said valves, means providing a passage around the valve in said second chamber, and a throttling valve in said last named passage.

10. In a device for controlling the flow of oxygen to an oxygen cutting torch, a base member provided with a chamber, means having an outlet for cutting oxygen communicating with said chamber, means providing a passage for the flow of preheat oxygen around said chamber but having a port communicating with said chamber, means forming a second chamber communicating with said passage, means providing an inlet passage having a port communicating with said second chamber, valves controlling said ports, a common operating means for said valves, means providing a passage around the valve in said second chamber, a throttling valve in said last named passage, and means communicting with the passage around said first named chamber for indicating the pressure.

11. In an apparatus for controlling the flow of oxygen to an oxygen cutting torch, a base member providing communicating passages which are always open for the flow of preheat oxygen, an adjustable throttling valve in said passages, means providing a passage in communication with said first named passages at opposite sides of said throttling valve for the flow of cutting oxygen around said throttling valve, a valve for controlling said last named passage, means providing a passage communicating with said first named passages for the flow of cutting oxygen, a valve controlling said last named passage, and common actuating means for controlling both of said last named valves.

12. In an apparatus for controlling the flow of oxygen to an oxygen cutting torch, a base member providing communicating passages which are always open for the flow of preheat oxygen, an adjustable throttling valve in said passages, means providing a passage in communication with said first named passages at opposite sides of said throttling valve for the flow of cutting oxygen around said throttling valve, a valve for controlling said last named passage, means providing a passage communicating with said first named passages for the flow of cutting oxygen, a valve controlling said last named passage, common actuating means for controlling both of said last named valves, and pressure indicating means communicating with said first named passages between said two last named valves.

13. In an apparatus for controlling the flow of oxygen to an oxygen cutting torch, a base member providing communicating passages which are always open for the flow of preheat oxygen, a pair of adjustable throttling valves in said passages, means providing a passage in communication with said first named passages at opposite sides of one of said throttling valves for the flow of cutting oxygen around said last named throttling valves, a valve for controlling said last named passage, means providing a passage communicating with said first named passages for the flow of cutting oxygen, a valve controlling said last named passage, and common actuating means for controlling both of said last named valves.

14. In a device for controlling the flow of oxygen to an oxygen cutting torch, a base member providing communicating passages for the flow of cutting oxygen, said passages having therein two valves arranged in series, means providing a passage in parallel with the passage controlled by one of said valves and in communication therewith at opposite sides of said last named valve, a throttling valve for controlling said last named passage, means providing a passage for oxygen around the other of said first named valves, a throttling valve for controlling said last named passage, and common actuating means for said two first named valves.

15. In a device for controlling the flow of oxygen to an oxygen cutting torch, a base member providing communicating passages for the flow of cutting oxygen, said passages having therein two valves arranged in series, means providing a passage in parallel with the passage controlled by one of said valves and in communication therewith at opposite sides of said last named valve, a throttling valve for controlling said last named passage, means providing a passage for oxygen around the other of said first named valves, a throttling valve for controlling said last named passage, a common actuating means for said two first named valves, and means in communication with the passages between the said first named valves for indicating the oxygen pressure thereat.

PAUL L. BETZ.

REFERENCES CITED

The following references are of record in the file of this patent:

UNITED STATES PATENTS

| Number | Name | Date |
|---|---|---|
| 1,879,940 | Mangiameli | Sept. 27, 1932 |
| 2,372,305 | Walker | Mar. 27, 1945 |
| 2,399,979 | Betz | May 7, 1946 |